3,652,550
11-AMINOALKYL ETHERS OF
6-MORPHANTHRIDONES
Gordon Northrop Walker, Morristown, N.J., assignor to
Ciba Corporation, Summit, N.J.
No Drawing. Filed Nov. 19, 1968, Ser. No. 777,146
Int. Cl. C07d 41/00
U.S. Cl. 260—239.3       11 Claims

ABSTRACT OF THE DISCLOSURE 11-aminoalkyl ethers of 5,6-dihydro-6-morphanthridones, e.g. those having the formula

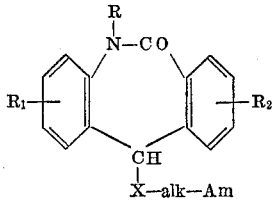

X=O or S
alk=lower alkylene with at least 2C
Am=an amino group
R=H or alkyl
$R_{1,2}$=H, alkyl, alkoxy, alkylmercapto, halogeno, $CF_3$, $NO_2$ or amino acyl derivatives, iminoethers, salts and quaternaries thereof decrease gastric secretion.

SUMMARY OF THE INVENTION

The present invention concerns and has for its object the provision of new 11-(amino-alkoxy or -alkylmercapto)-5,6-dihydro-6-morphanthridones, more particularly those of Formula I,

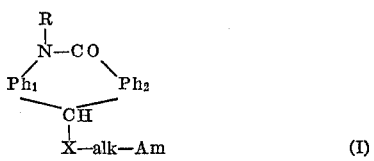

in which each of $Ph_1$ and $Ph_2$ stands for a 1,2-phenylene radical, X for oxygen or sulfur, R for hydrogen or lower alkyl, alk for lower alkylene separating X from Am by at least 2 carbon atoms and Am for an amino group, acyl derivatives, iminoethers, salts and quaternaries thereof, as well as of corresponding pharmaceutical compositions and of methods for the preparation of these products. Said compositions are especially useful in the management and treatment of gastric irritation or of gastric ulcers by reducing the amount of free acid in the stomach.

DESCRIPTION OF THE PREFERRED EMBODIMENTS

The 1,2-phenylene radicals $Ph_1$ and $Ph_2$ are unsubstituted or substituted by one or more than one of the same or of different substituents, for example lower alkyl, such as methyl, ethyl, n- or i-propyl or -butyl, free or functionally converted hydroxy or mercapto groups, such as lower alkoxy or alkylmercapto, e.g., methoxy, ethoxy, n- or i-propoxy or -butoxy, halogen, e.g. fluoro, chloro or bromo, trifluoromethyl, nitro or amino, especially di-lower alkylamino, e.g. dimethylamino or diethylamino. The term "lower" referred to above and hereinafter in connection with organic radicals or compounds respectively, defines such with up to 7, preferably up to 4, carbon atoms. Preferred radicals $Ph_1$ and $Ph_2$ are 1,2-phenylene, (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro)-1,2-phenylene and (di-lower alkylamino)-1,2-phenylene.

The lower alkylene radical alk is, for example, 1,2-ethylene, 1,2- or 1,3-propylene, 2-methyl-1,3-propylene, 1,2- 1,3-, 1,4- or 2,3-butylene, 1,5- or 2,4-pentylene, 1,3- or 1,6-hexylene or 3,5-heptylene.

The amino group Am is a primary, secondary or preferably a tertiary amino group, such as amino, mono- or di-lower alkylamino, e.g. methylamino, ethylamino, n- or i-propylamino or n-butylamino; dimethylamino, N-methyl-N-ethylamino, diethylamino, di-n-propylamino, di-isopropylamino or di-n-butylamino; free or esterified hydroxy-lower alkylamino, N-(hydroxy-lower alkyl)-N-lower alkylamino or di(hydroxy-lower alkyl)-amino, in which hydroxy is separated from the amino nitrogen by at least 2 carbon atoms, e.g. 2-hydroxyethylamino, 3-hydroxypropylamino, N-(2-hydroxyethyl)-N-methylamino or di-(2-hydroxyethyl)-amino; mono-cyclic cycloalkylamino, cycloalkyl-lower alkylamino, N-cycloalkyl-N-lower alkylamino or N-cycloalkyl-lower alkyl-N-lower alkylamino in which cycloalkyl has preferably 3 to 7 ring-carbon atoms, e.g. cyclopropylamino, cyclopentylamino, cyclohexylamino, cyclopropylmethylamino, 2-cyclopentyl-ethylamino, N-cyclopentyl-N-methylamino, N-cyclohexyl-N-methylamino, N-cyclohexyl-N-ethylamino, N-cyclopentylmethyl-N-ethylamino or N-(2-cyclopentylethyl)-N-methylamino, aralkylamino or N-lower alkyl-N-aralkylamino, in which the aryl, e.g. phenyl, moiety is unsubstituted or substituted as shown for $Ph_1$ and $Ph_2$, such as benzylamino, 2-phenethylamino, N-methyl-N-benzylamino, N-ethyl-N-benzylamino or N-ethyl-N-(1- or 2-phenethyl)-amino; lower alkyleneimino or free or esterified hydroxy-alkyleneimino, e.g. ethyleneimino, pyrrolidino, 2-methyl-pyrrolidino, piperidino, 2- or 4-methyl-piperidino, 3- or 4-hydroxy-piperidino, 3-hydroxymethyl-piperidino, 1,6- or 2,5-hexamethyleneimino, 1,7- or 2,6-heptamethyleneimino, lower monooxa- or thia-alkyleneimino, e.g. morpholino, 3-methyl-morpholino or thiamorpholino, mono-aza-lower alkyleneimino, N-lower alkyl- or free or esterified N-(hydroxy-lower alkyl)-mono-aza-lower alkyleneimino, e.g. piperazino, N-methyl, -ethyl-, -n-propyl, -i-propyl, -2-hydroxyethyl- or -3-hydroxypropyl-piperazino, N-methyl-, -ethyl- or n-propyl-3-aza-1,5- or 1,6-hexyleneimino, or N-methyl-4-aza-1,7- or 2,6-heptyleneimino. The amino group Am may also be linked with the alk-moiety, so that alk-Am together represents, for example, 3 to 7 ring-membered aza-cycloalkyl, N-lower alkyl-aza-cycloalkyl or N-lower alkyl-aza-cycloalkyl-lower alkyl, e.g. 2- or 3-pyrrolidyl, 1-methyl- or -ethyl-3-pyrrolidyl, 3- or 4-piperidyl or 1-methyl or -ethyl-3- or 4-piperidyl or -piperidylmethyl. In the corresponding compounds of Formula I, the heteroatoms in the saturated moieties are separated by at least 2 carbon atoms.

Acyl derivatives of the invention are preferably those of the primary or secondary amines or hydroxyalkyl compounds, but may also be those containing the acyl group attached to the nitrogen atom in 5-position. The acyl group therein stands preferably for lower alkanoyl, such as acetyl, propionyl, butyryl or pivalyl, but also for lower alkenoyl, such as acryloyl or methacryloyl, monocyclic carbocyclic aroyl or aryl-lower alkanoyl or alkenoyl, such as benzoyl, phenylacetyl or cinnamoyl. Said radicals may be unsubstituted of substituted, especially in the aromatic portion, as shown for $Ph_1$ and $Ph_2$.

The iminoethers of the invention are preferably the lower alkyl or aralkyl iminoethers, in which the lower alkyl or aralkyl, e.g. phenyl-lower alkyl radical, for example, is methyl, ethyl, n- or i-propyl, -butyl, -pentyl, -hexyl or heptyl; benzyl, 1- or 2-phenyl-ethyl. Said iminoethers are more particularly defined as 6-lower alkoxy or aralkoxy - 11 - (aminoalkoxy or aminoalkylmercapto)-morphanthridines.

The compounds of the invention exhibit valuable pharmacological properties. Apart from some diuretic and antiinflammatory effects, they primarily cause a decrease in the gastric secretion, especially of gastric hydrochloric acid, as can be demonstrated in animal tests using, for example mammals, e.g. rats or dogs as test objects. In the latter, gastric secretion may be induced either by food or parenteral application of histamine, whereupon the compounds of the invention are applied orally, for example, at a dosage between about 0.1 and 10 mg./kg./day, preferably between 1 and 5 mg./kg./day, and the gastric juice is collected via a Pavlov or Heidenhain pouch. Besides their abovementioned utility, the compounds of this invention are also useful as research tools in the study of the releasing mechanism of gastric secretion or as intermediates in the manufacture of other valuable, particularly pharmacologically active, compounds.

Particularly useful are compounds of Formula I, in which each of $Ph_1$ and $Ph_2$ is 1,2-phenylene, (lower alkyl)-1,2-phenylene, (lower alkoxy)-1,2-phenylene or (halogeno)-1,2-phenylene, X is oxygen or sulfur, R is hydrogen or lower alkanoyl, alk is lower alkylene separating X from Am by 2 to 4 carbon atoms and Am is dilower alkylamino, lower alkyleneimino, mono-aza, oxa- or thialower alkyleneimino or N-lower alkyl- or N-(hydroxy- or lower alkanoyloxy-lower alkyl)-aza-lower alkyleneimino, or alk-Am together represents 5 to 6 ring-membered N-lower alkyl-aza-cycloalkyl or N-lower alkyl-aza-cycloalkyl-lower alkyl, wherein the heteroatoms are separated by at least 2 carbon atoms, lower alkyl iminoethers, acid addition salts and lower alkyl quaternaries thereof.

Especially valuable are the compounds of Formula II

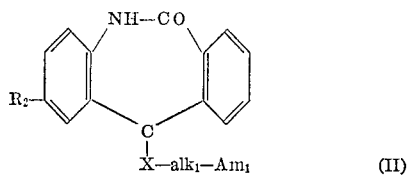
(II)

in which $alk_1$ is 1,2-ethylene, 1,2- or 1,3-propylene, $Am_1$ is dimethylamino, diethylamino, pyrrolidino, piperidino, morpholino or 4-methyl-piperazino, or $alk_1$-$Am_1$ together is N-methyl or ethyl-3- or 4-piperidyl or -piperidylmethyl, X is oxygen or sulfur and $R_2$ is hydrogen or chlorine, and therapeutically useful acid addition salts thereof which, when applied to rats at oral doses between about 10 and 50 mg./kg. show some antiinflammatory effects or, when applied to dogs with a Pavlov or Heidenhain pouch at oral doses between about 0.1 and 5 mg./kg., cause excellent inhibition of, preferably the food induced, gastric secretion.

The compounds of the invention are prepared according to methods in themselves known. Advantageously they are obtained by:

(a) Reacting an 11-hydroxy-5,6-dihydro-6-morphanthridone with an amino-alkanol or -mercaptan, one of which is reactively esterified, more particularly compounds of the formulae

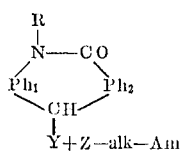

in which one of Y and Z stands for hydroxy or mercapto and the other for a halogen atom or an aliphatic or aromatic sulfonyloxy group or (b) Reacting a reactively esterified 11-(hydroxy-alkoxy or alkyl-mercapto)-5,6-dihydro-6-morphanthridone with ammonia, a primary or secondary amine, more particularly compounds of the formulae

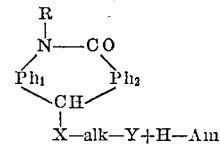

in which Y stands for a halogen atom or an aliphatic or aromatic sulfonyloxy group, or (c) Hydrolyzing or alcoholizing a reactive functional derivative of an 11-(amino-alkoxy or alkylmercapto)-6-hydroxy-morphanthridine, more particularly a compound of the formula

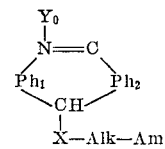

in which $Y_0$ stands for a halogen atom or an aliphatic or aromatic sulfonyloxy group or the group X-alk-Am and, if desired, converting any resulting compound into another disclosed compound.

In the starting material used in the above reactions, Y preferably represents halogen, e.g. chloro, bromo or iodo, but may also stand for sulfonyloxy, e.g. methane-, ethane- or benzene-sulfonyloxy, tosyloxy or brosyloxy.

The above process is carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

In the above process, e.g. reactions (a) and (b), the amine reagent is advantageously used in excess, in order to neutralize the generated acid. It may, however, also be used in equivalent amounts and in the presence of other condensing agents such as inorganic or organic bases, e.g. alkali metal carbonates or bi-carbonates or tertiary nitrogen bases, for example tri-lower alkylamines, N,N-dimethylaniline or pyridine. Hydrolysis according to reaction (c) is carried out in the usual manner, for example, with the use of aqueous acids or bases and alcoholysis advantageously with the use of alcoholates, e.g. alkali metal lower alkanolates or aralkanolates, in order to obtain the iminoethers.

The compounds of the invention so-obtained may be converted into each other according to known methods. For example, resulting compounds in which Am stands for a primary or secondary amino group and R for hydrogen, may be reacted with a reactive ester of a corresponding alcohol, for example, such mentioned above, or may be acylated, for example, with a reactive functional derivative of a corresponding acid, such as a halide or anhydride thereof, or resulting acyl derivatives may be hydrolyzed, for example, with the use of acidic or alkaline hydrolyzing agents. Resulting esters may also be hydrolyzed or transesterified or resulting alcohols esterified. Resulting tertiary amines may be quaternized in the usual manner, for example with the use of reactive esters of alcohols, preferably of lower alkanols, but also of aralkanols or resulting quaternaries converted into tertiary amines. For example, from benzyl-quaternaries the benzyl residue can be split off by hydrogenation.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric, or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophane, lysine and arginine.

These or other salts of the invention, for example, the picrates, can also be used for purification of the bases obtained; the bases are converted into salts, the salts are separated and the bases are liberated from the the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines or alcohols mentioned above may be used in the form of their alkali metal, e.g. sodium or potassium salts. Mainly, those starting materials should be used in the process of the invention that lead to the formation of those compounds indicated above as being specially valuable.

The starting material used is known or, if new, may be prepared according to known methods. For example, that used in reaction (a) can be obtained by reducing corresponding 5,6-dihydro-morphanthridine-6,11 - diones with sodium borohydride and, if desired, esterifying the resulting 11-hydroxy compound in the usual manner, e.g. with the use of thionyl or sulfonyl halides, or reacting it with phosphorus pentasulfide or an 11-halide with sodium hydrosulfide. Resulting 11-halides may then be reacted with a free or reactively esterified glycol or hydroxyalkylmercaptane, e.g. a Y-alkanol or Y-alkylmercaptane, or a 11-hydroxy or mercapto compound with an alkylene oxide, and resulting 11-(hydroxy-alkoxy or alkylmercapto)-compounds may be reacted with thionyl or sulfonyl halides, preferably in the presence of bases, e.g. pyridine, in order to obtain the starting material used in reaction (b). Under more drastic conditions the 11-hydroxy-5,6-dihydro-6-morphanthridones are esterified in 6- and 11-position, for example with the use of phosphorus pentahalides or oxyhalides and/or sulfonyl halides. Resulting esters of 6,11-dihydroxy-morphanthridines may then be reacted with aminoalkanols or aminoalkylmercaptanes, in order to yield the compounds used in reaction (c).

The compounds of the invention can be used, for example, for the manufacture of pharmaceutical compositions containing them in conjunction or admixture with inorganic or organic, solid or liquid pharmaceutical excipients, suitable for enteral or parenteral or (as antiinflammants) also topical administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragées or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

EXAMPLE 1

The mixture of 3 g. 2,11-dichloro-5,6-dihydro-6-morphanthridone and 12 g. 2-dimethylamino-ethanol is heated at the steam cone for 1½ hour. It is then evaporated in vacuo, the residue poured into water, the mixture extracted with diethyl ether, the extract washed with water, dried and evaporated. The residue is recrystallized from diethyl ether and aqueous ethanol to yield the 2-chloro-11 - (2 - dimethylamino-ethoxy) - 5,6 - dihydro-6-morphanthridone of the formula

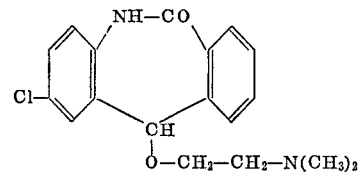

melting at 164 to 166°.

EXAMPLE 2

The mixture of 10 g. 2,11-dichloro-5,6-dihydro-6-morphanthridone and 40 g. 3-dimethylamino-propanol is heated at the steam cone for 8 hours while stirring and is allowed to stand at room temperature overnight. It is then concentrated to about 20 ml. and poured into ice water. The precipitate formed is filtered off, taken up in diethyl ether, the solution dried, filtered and evaporated. The residue is recrystallized from diethyl ether to yield the 2-chloro - 11 - (3-dimethylamino-propoxy)-5,6-dihydro-6-morphanthridone of the formula

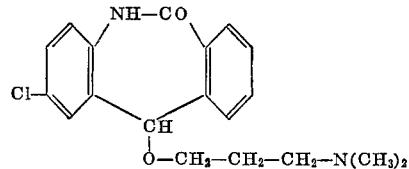

melting at 131 to 132°.

EXAMPLE 3

The mixture of 10 g. 2,11-dichloro-5,6-dihydro-6-morphanthridone and 25 g. 2-pyrrolidino-ethanol is heated at the steam cone for 8 hours while stirring and is allowed to stand at room temperature overnight. It is concentrated in vacuo and the concentrate partitioned between diethyl ether and aqueous methanol. The organic layer is washed with water, dried, filtered, evaporated and the residue recrystallized from diethyl ether to yield the 2 - chloro - 11-(2-pyrrolidino-ethoxy)-5,6-dihydro-morphanthridone of the formula

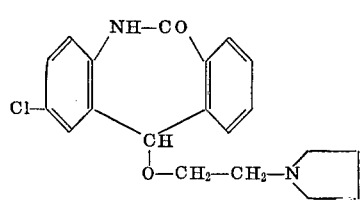

melting at 135 to 136°.

2 g. thereof are dissolved in diethyl ether and the solution is acidified with ethanolic hydrochloric acid. The precipitate formed is filtered off and recrystallized from methanol-diethyl ether to yield the corresponding hydrochloride hemihydrate melting at 222 to 223° with decomposition.

EXAMPLE 4

The mixture of 10 g. 2,11-dichloro-5,6-dihydro-6-morphanthridone and 30 g. 2-piperdino-ethanol is heated at the steam cone for 8 hours while stirring and is allowed to stand overnight at room temperature. It is concentrated to about 30 ml., poured into ice water and the precipitate formed filtered off. It is washed with water, triturated with hot diethyl ether and the etheral solution filtered off. It is washed with water, dried, filtered, evaporated and the residue taken up in diethyl ether. The solution is acidified with ethanolic hydrochloric acid, the precipitate formed filtered off and dissolved in water. The resulting solution is made basic with aqueous sodium hydroxide, the precipitate formed filtered off and recrystallized from diethyl ether to yield the 2-chloro-11-(2-piperidino-ethoxy)-5,6-dihydro-6-morphanthridone of the formula

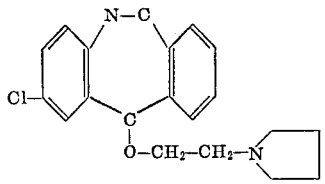

melting at 142 to 143°.

EXAMPLE 5

The mixture of 10 g. 2,11-dichloro-5,6-dihydro-6-morphanthridone, 15 ml. 1-ethyl-3-hydroxy-piperidine and 40 ml. benzene is heated at the steam cone for 8 hours while stirring and is allowed to stand overnight at room temperature. It is then poured into water, the mixture extracted with diethyl ether, the extract washed with water, dried, filtered and evaporated. The residue is taken up in diethyl ether, the solution acidified with ethanolic hydrochloric acid, the precipitate formed filtered off, recrystallized from ethanol-diethyl ether and dried in vacuo, to yield the 2-chloro-11-(1-ethyl-3-piperidyloxy)-5,6-dihydro-6-morphanthridone hydrochloride of the formula

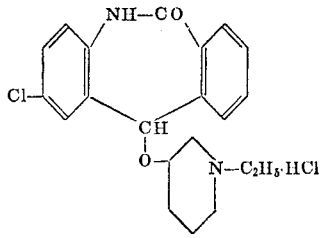

melting at 254 to 255° with decomposition.

EXAMPLE 6

The mixture of 10 g. 2,11-dichloro-5,6-dihydro-6-morphanthridone, 20 g. 2-morpholino-ethanol and 0.5 g. potassium tert. butylate is heated at the steam cone for 7 hours. After cooling it is poured into ice water, the precipitate formed filtered off, washed with water, dried and recrystallized from diethyl ether to yield the 2-chloro-11 - (2-morpholino-ethoxy) - 5,6 - dihydro-6-morphanthridone of the formula

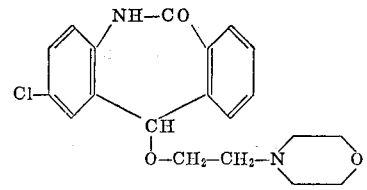

melting at 135–137°.

EXAMPLE 7

In the analogous manner described in the previous Examples, the final products listed below are prepared from corresponding amounts of the respective starting materials:

| Starting material | | Final product |
|---|---|---|
| 2-methoxy-11-chloro-5,6-dihydro-6-morphanthridone. | 2-ethylaminoethanol | 2-methoxy-11-(2-ethylaminoethoxy)-5,6-dihydro-6-morphanthridone. |
| 4-methylmercapto-11-chloro-5,6-dihydro-6-morphanthridone. | 2-(2-hydroxyethyl amino)-ethanol. | 4-methylmercapto-11-[2-(2-hydroxy-ethylamino)-ethoxy]-5,6-dihydro-6-morphanthridone. |
| 9-trifluoromethyl-11-chloro-5,6-dihydro-6-morphanthridone. | 3-cyclopentylaminopropanol. | 9-trifluoromethyl-11-(3-cyclopentylamino-propoxy)-5,6-dihydro-6-morphanthridone. |
| 8-nitro-2,11-dichloro-5,6-dihydro-6-morphanthridone. | 2-thiamopholino-ethanol. | 2-chloro-8-nitro-11-(2-thiamorpholino-ethoxy)-5,6-dihydro-6-morphanthridone. |
| 2-dimethylamino-11-chloro-5,6-dihydo-6-morphanthridone. | 4-benzylamino-butanol. | 2-dimethylamino-11-(4-benzylamino-butoxy)-5,6-dihydro-6-morphanthridone. |
| 3,8-dimethyl-11-chloro-5,6-dihydro-6-morphanthridone. | 2-(4-methyl-piperazino)-ethanol. | 3,8-dimethyl-11-[2-(4-methyl-piperazino)-ethoxy]-5,6-dihydro-6-morphanthridone. |
| 2,11-dichloro-5,6-dihydro-6-morphanthridone. | 2-dimethylamino-ethylmercaptane. | 2-chloro-11-(2-dimethylamino-ethylmercapto)-5,6-dihydro-6-morphanthridone. |
| 9-methyl-11-chloro-5,6-morphanthridone. | 2-pyrrolidino-ethylmercaptane. | 9-methyl-11-(2-pyrrolidino-ethylmercapto)-5,6-dihydro-6-morphanthridone. |
| 2,11-dichloro-5,6-dihydro-6-morphanthridone. | 4-dimethylamino-2-pentanol. | 2-chloro-11-(4-dimethylamino-2-pentoxy)-5,6-dihydro-6-morphanthridone. |

EXAMPLE 8

Preparation of 160,000 tablets each containing 0.025 g. of the active ingredient.

| Ingredients: | G. |
|---|---|
| 2-chloro-11-(2-dimethylamino-ethoxy)-5,6-dihydro-6-morphanthridone | 4,000.0 |
| Lactose | 28,289.0 |
| Corn starch | 3,410.0 |
| Confectioners sugar | 2,800.0 |
| Colloidal silica | 1,000.0 |
| Stearic acid powder | 400.0 |
| Calcium stearate | 100.0 |
| Purified water, q.s. | |

Procedure

The active ingredient, the lactose, 2,500.0 g. of the corn starch, the confectioners sugar and the colloidal silica are passed through a screen with 1 mm. openings into a mixer and blended at low speed for twenty minutes. The remainder of the corn starch is suspended in 1 liter cold water, and a paste is formed by gradually adding 4 liters of boiling water. The mixed powders are granulated with the above paste, using additional water as required. The resulting moist mass is passed through a screen with 4 mm. openings, placed on trays and dried at 38° C. until the moisture content is between 2 and 3%. The granules are broken in a comminuting machine, knives forward, passed through a screen with 1 mm. openings, and treated with the stearic acid and the calcium stearate, both screened through a screen with 0.8 mm. openings. After mixing for twenty minutes, the granulation is compressed into tablets using standard concave punches, uppers doubly scored.

In the analogous manner compositions are prepared containing as the active ingredient one of the compounds described in Examples 2–6.

EXAMPLE 9

The mixture of 10 g. 2,11-dichloro-5,6-dihydro-6-morphanthridone and 20 g. 1-methyl-4-hydroxy-piperidine is heated at the steam cone for 24 hours. Hereupon 200 ml. xylene are added, the mixture refluxed for 4 hours and allowed to stand overnight at room temperature. The organic solution is decanted off, extracted with 2 N hydrochloric acid and the aqueous layer made basic with aqueous sodium hydroxide. It is extracted with diethyl ether, the extract dried, filtered and evaporated. The residue is taken up 2 times more in hydrochloric acid and precipitated with sodium hydroxide, to yield the 2-chloro-11-(1-methyl-4-piperidyloxy)-5,6-dihydro-6-morphanthridone of the formula

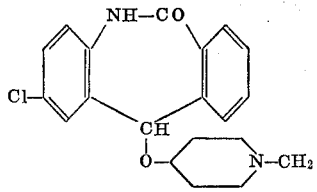

melting at 148–150° after recrystallization from diethyl ether.

In the analogous manner the 2-chloro-11-(1-methyl-3-piperidyloxy)-5,6-dihydro-6-morphanthridone is prepared, M.P. 160° (from diethyl ether); the corresponding hydrochloride melts at 270–272° (from ethanol).

EXAMPLE 10

The mixture of 10 g. 11-chloro-5,6-dihydro-6-morphanthridone and 20 g. 1-methyl-3-hydroxymethyl-piperidine is heated at the steam cone for 12 hours and allowed to stand overnight at room temperature. It is diluted with water, extracted with diethyl ether, the extract washed with water, dried, filtered and evaporated. The residue is taken up in diethyl ether, the solution filtered, the filtrate acidified with ethanolic hydrochloric acid and the precipitate formed filtered off. It is washed with diethyl ether, taken up in water, the solution filtered, and the filtrate made basic with aqueous sodium hydroxide. The precipitate formed is filtered off, dissolved in diethyl ether, the solution washed with water, dried, filtered and evaporated. The residue is taken up in 2 N aqueous hydrochloric acid, the solution washed with diethyl ether, the aqueous layer made basic with aqueous sodium hydroxide, and extracted with diethyl ether. The extract is dried, filtered and evaporated, to yield the 11-(1-methyl-3-piperidylmethoxy)-5,6-dihydro-6-morphanthridone of the formula

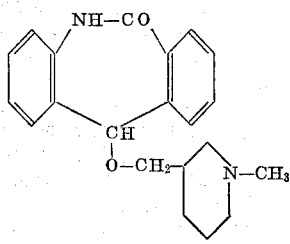

melting at 126–130°, after recrystallization from diethyl ether.

In the analogous manner the 2-chloro-11-(1-methyl-3-piperidylmethoxy)-5,6-dihydro - 6 - morphanthridone is prepared, M.P. 151–153° (from diethyl ether).

EXAMPLE 11

The mixture of 10 g. 11-chloro-5,6-dihydro-6-morphantridone and 30 g. 2-dimethylamino-ethanol is heated at the steam cone for 8 hours and allowed to stand overnight at room temperature. It is concentrated to a total volume of 25 ml., the concentrate diluted with water and the mixture extracted with diethyl ether. The extract is washed with water, dried, filtered and evaporated. The residue is taken up in 5% aqueous hydrochloric acid, the mixture washed with diethyl ether and the aqueous layer made basic with aqueous sodium hydroxide. It is extracted with diethyl ether, the extract washed with water, dried, filtered and evaporated, to yield the 11-(2-dimethyl-amino-ethoxy)-5,6-dihydro - 6 - morphanthridone of the formula

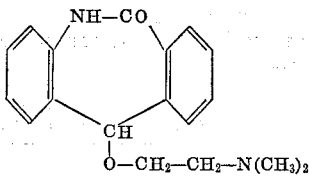

as a yellow glass.

0.5 g. thereof are treated with 3 ml. methyl iodide and the mixture stirred at room temperature for 15 minutes. It is taken up in hot ethanol and the solution kept in the cold overnight. The precipitate formed is filtered off and recrystallized from ethanol to yield the 11-(2-dimethylamino - ethoxy)-5,6-dihydro-6-morphanthridone methoiodide melting at 178–180°.

EXAMPLE 12

To the solution of 1.0 g. 11-(1-methyl-3-piperidyl-methoxy)5,6-dihydro-6-morphanthridone in the minimum amount of acetone, 3 ml. methyl iodide are added and the mixture heated for half an hour. The supernatant solution is decanted off and the residue triturated with warm ethanol. The crystals formed are filtered off and recrystallized from ethanol to yield the 11-(1-methyl-3-piperidylmethoxy)-5,6-dihydro - 6 - morphanthridone methoiodide of the formula

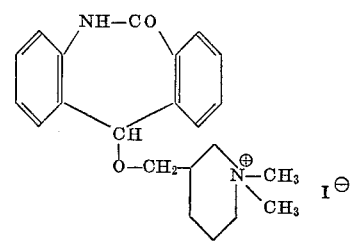

melting at 193–195°.

EXAMPLE 13

To the ice cold solution, prepared from 3.9 g. sodium and 250 ml. methanol, 12.5 g. 2-dimethylaminoethylmercarbon hydrochloride are added, followed by 10 g. 11-chloro-5,6-dihydro-6-morphanthridone. The mixture is slowly heated to the boil and refluxed for 10 minutes. It is evaporated in vacuo, the residue taken up in water, the mixture extracted with diethyl ether, the extract washed with water, dried, filtered and evaporated. The residue is triturated with diethyl ether and recrystallized from ethanol, to yield the 11-(2-dimethylamino-ethylmercapto)-5,6-dihydro-6-morphanthridone of the formula

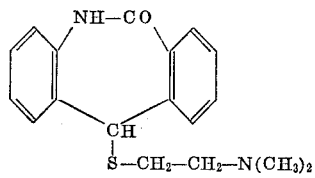

melting at 152–155°.

EXAMPLE 14

To the solution, prepared from 3.0 g. sodium and 250 ml. methanol, 10 g. 2-dimethylamino-ethylmercaptan hydrochloride are added at 0°, followed by 11 g. 2,11-dichloro-5,6-dihydro-6-morphanthridone. The mixture is slowly heated and refluxed for 10 minutes. It is evaporated during about half an hour, the residue poured into ice water and the precipitate formed filtered off. The residue is recrystallized from ethanol, to yield the 2-chloro-11-(2- dimethylamino - ethylmercapto) - 5,6-dihydro-6-morphanthridone of the formula

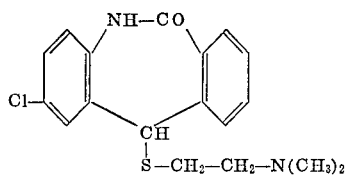

melting at 141–143°.

0.5 g. thereof are dissolved in the minimum amount of hot ethanol and the ethanolic solution of 0.5 g. picric acid is added. The precipitate formed after cooling is filtered off, washed with ethanol and recrystallized from ethanol, to yield the corresponding picrate melting at 246–248° with decompositions.

EXAMPLE 15

The mixture of 1.0 g. 2-chloro-11-(2-dimethylaminoethylmercapto) - 5,6 - dihydro-6-morphanthridone, 5 ml. methyl iodide and 5 ml. ethanol is refluxed for 1 hour. The precipitate formed after cooling is filtered off and recrystallized from ethanol, to yield the 2-chloro-11-(2-dimethylamino - ethylmercapto)-5,6-dihydro-6-morphanthridone methoiodide of the formula

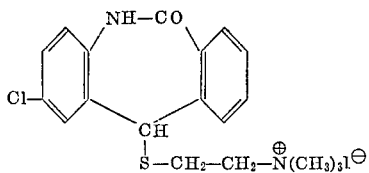

melting at 262–264° with decomposition.

EXAMPLE 16

The mixture of 2.0 g. 2-chloro-11-(1-methyl-4-piperidyloxy) - 5,6 - dihydro-6-morphanthridone, 50 ml. acetanhydride and 3 ml. pyridine is refluxed for 3 hours and then evaporated. The residue is taken up in diethyl ether, the solution washed with water, dried, filtered and evaporated. The residue is triturated with ethyl acetate to yield the 5-acetyl-2-chloro-11-(1 - methyl - 4 - piperidyloxy)-5,6-dihydro-6-morphanthridone of the formula

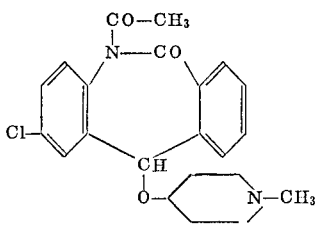

EXAMPLE 17

To the mixture of 2 g. 6-chloro-11-(2-dimethylaminoethoxy)-morphanthridone and 20 ml. methanol, the hot solution prepared from 1 g. sodium and 25 ml. methanol is added portionwise while stirring and the mixture is allowed to stand for 5 hours at room temperature. It is concentrated, poured onto ice water and the precipitate formed filtered off. It is washed with water, dried and recrystallized from aqueous methanol to yield the 6-methoxy-11-(2-dimethylamino-ethoxy) - morphanthridine of the formula

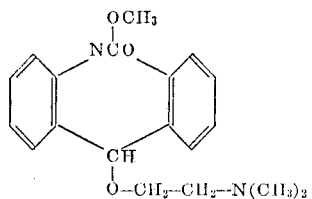

The starting material is prepared as follows: The mixture of 5.0 g. 11-hydroxy-5,6-dihydro-6-morphanthridone, 50 ml. phosphorus oxychloride and 5 drops of pyridine is refluxed for 2 hours and evaporated in vacuo. The residue is recrystallized from diethyl ether to yield the 6,11-dichloro-morphanthridine melting at 166–169°.

To 2.6 g. thereof, 0.9 g. 2-dimethylamino-ethanol, 20 ml. benzene and a few drops pyridine are added and the mixture stirred at room temperature overnight. It is slowly evaporated and the residue, containing the 6-chloro-11-(2-dimethylamino-ethoxy)-morphanthridine, used as such without further purification.

EXAMPLE 18

The mixture of 3.2 g. 5-methyl-11-chloro-5,6-dihydro-6-morphanthridone, 5 ml. 1-ethyl-3-hydroxy-piperidine and 15 ml. benzene is heated at the steam cone for 16 hours while stirring. After cooling it is poured into water, the mixture extracted with diethyl ether, the extract washed with water, dried, filtered and evaporated. The residue is taken up in diethyl ether, the solution acidified with ethanolic hydrochloric acid, the precipitate formed filtered off and recrystallized from ethanoldiethyl ether, to yield the 5-methyl-11-(1-ethyl-3-piperidyloxy)-5,6-dihydro-6-morphanthridone hydrochloride of the formula

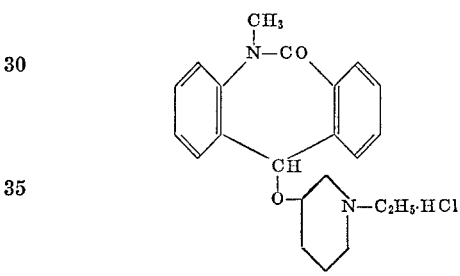

The starting material is prepared as follows: To the mixture of 13.5 g. 5,6-dihydro-morphanthridine-6,11-dione and 600 ml. toluene, 4.0 g. of a 56% suspension of sodium hydride in mineral oil are added while stirring and refluxing for ½ an hour. Hereupon 75 ml. methyl iodide are added portionwise and the whole refluxed and stirred for 6 hours. After cooling water and diethyl ether are added, the organic layer separated, washed with water, dried, filtered and evaporated. The residue is triturated with diethyl ether and the crystals formed filtered off to yield the 5 - methyl - 5,6 - dihydro-6-morphanthridione-6,11-dione, melting at 92–95°.

To the solution of 7.0 g. thereof in 200 ml. methanol, 25.0 g. sodium borohydride are added protionwise while stirring. The mixture is concentrated on the steam cone, the precipitate formed filtered off, washed with water, dried and recrystallized from methanol, to yield the 5-methyl-11-hydroxy-5,6-dihydro-6-morphanthridone, melting at 195–197°.

The mixture of 6.9 thereof and 200 ml. thionyl chloride is refluxed for 30 minutes and then evaporated. The residue is triturated with diethyl ether and filtered off, to yield the 5-methyl-11-chloro-5,6-dihydro - 6 - morphanthridone melting at 162–163°.

EXAMPLE 19

To the mixture of 5 g. 2-chloro-11-(1-benzyl-4-piperidyloxy)-5,6-dihydro - 6 - morphantridone and 200 ml. toluene, 0.55 g. of a 56% suspension of sodium hydride in mineral oil are added at room temperature. After ½ hour 25 ml. methyl iodide are added and the mixture refluxed for 3 hours. After cooling ice and water are added while stirring, the precipitate formed filtered off, washed with ice water and recrystallized from methanolacetone, to yield the 2-chloro-5-methyl-11-(1-benzyl-4- piperidyloxy)-5,6-dihydro-6-morphanthridone methoiodide of the formula

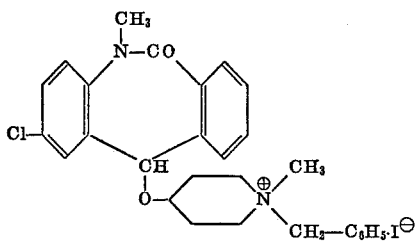

The mixture of 3.8 g. thereof, 250 ml. methanol and 2.0 g. 10% palladium on charcoal is hydrogenated at 48 p.s.i. and about 50° until the hydrogen uptake ceases. The resulting suspension is filtered, the filtrate evaporated, the residue triturated with diethyl ether and recrystallized from ethanol, to yield the 2-chloro-5-methyl-11-(1-methyl - 4 - piperidyloxy)-5,6-dihydro-6-morphanthridone hydroiodide.

The starting material is prepared as follows: The mixture of 67.0 g. 5,6-dihydro-morphanthridin-6,11-dione, 45.0 g. N-chloro-succinimide and 1.2 liter glacial acetic acid is refluxed for 5 hours. Upon cooling, crystals separate which are filtered off, washed with diethyl ether and recrystallized from dimethylformamide to yield the 2-chloro-5,6-dihydro-morphanthridin-6,11-dione melting at 310°.

20.0 g. thereof are dissolved in 800 ml. methanol and 10.0 g. sodium borohydride are added in portions during about 10 minutes. The mixture is concentrated at the steam cone to about 100 ml. and then cooled. The precipitate formed is filtered off, washed with water, dried and recrystallized from methanol to yield the 2-chloro-11-hydroxy-5,6-dihydro - 6 - morphanthridone melting at 273–274°.

The mixture of 60.0 g. thereof and 500 ml. thionyl chloride is heated at the steam cone until it becomes homogeneous. It is then evaporated, the residue dissolved in ethyl acetate, the solution filtered and concentrated. Upon cooling, crystals separate which are filtered off and recrystallized from ethyl acetate to yield the 2,11-dichloro-5,6-dihydro-6-morphanthridone melting at 254–257° with decomposition.

The mixture of 5 g. thereof and 10 g. 1-benzyl-4-hydroxy-piperidine is heated at the steam cone for 24 hours. Hereupon 100 ml. xylene are added and the mixture refluxed for 4 hours. It is evaporated in vacuo, the residue taken up in 5% hydrochloric acid, the solution filtered and the filtrate made basic with aqueous sodium hydroxide. It is extracted with diethyl ether, the extract dried, filtered and evaporated to yield the 2-chloro-11-(1-benzyl-4-piperidyloxy)-5,6-dihydro-6-morphanthridone.

EXAMPLE 20

Preparation of 10,000 tablets each containing 50.0 mg. of the active ingredients.

Formula:                                                                 G.
  2-chloro-11-(1-ethyl - 3 - piperidyloxy)-5,6-
    dihydro - 6 - morphanthridone hydro-
    chloride _____ 500.00
  Lactose _____ 1,706,00
  Corn starch _____ 90.00
  Polyethylene glycol 6,000 _____ 90.00
  Talcum powder _____ 90.00
  Magnesium stearate _____ 24.00
  Purified water, q.s.

Procedure

All the powders are passed through a screen with an opening of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

EXAMPLE 21

The mixture of 3 g. 2-chloro-11-(2-chloro-ethoxy)-5,6-dihydro - 6 - morphanthridone and 5 ml. morpholine is heated at the steam cone for 6 hours. After cooling 50 ml. cold water are added, the mixture extracted with methylene chloride, the extract washed with water and finally with 10% aqueous hydrochloric acid. The acetic layer is separated, made basic with aqueous sodium carbonate and the mixture extracted with diethyl ether, to yield the 2-chloro-11-(2-morpholino-ethoxy)-5,6-dihydro-6-morphanthridone melting at 135–137°; it is identical with the compound obtained according to Example 6.

The starting material is prepared as follows: The mixture of 2.8 g. 2,11-dichloro-5,6-dihydro-6-morphanthridine, 0.9 g. ethylene chlorohydrin, 20 ml. dioxane and 0.8 g. pyridine is heated at the steam cone for ½ an hour. It is cooled poured into cold water, the mixture extracted with ethyl acetate, the extract washed with water, dried, filtered and evaporated, to yield the 2-chloro-11-(2-chloro-ethoxy)-5,6-dihydro-6-morphanthridone which is used as such without further purification.

EXAMPLE 22

Preparation of 10,000 tablets each containing 1.0 mg. of the active ingredient.

Formula:                                                                 G.
  11-(1-methyl - 3 - piperidyl-methoxy)-5,6-di-
    hydro-6-morphanthridone _____ 10.00
  Lactose _____ 828.00
  Corn starch _____ 50.00
  Polyethylene glycol 6,000 _____ 50.00
  Talcum powder _____ 50.00
  Magnesium stearate _____ 12.00
  Purified water, q.s.

Procedure

All the powders are passed through a screen with openings of 0.6 mm. Then the drug substance, lactose, talcum, magnesium stearate and half of the starch are mixed in a suitable mixer. The other half of the starch is suspended in 25 ml. water and the suspension added to the boiling solution of the polyethylene glycol in 100 ml. water. The paste formed is added to the powders which are granulated, if necessary, with an additional amount of water. The granulate is dried overnight at 35°, broken on a screen with 1.2 mm. openings and compressed into tablets using flat punches with 4.8 mm. diameter, uppers bisected.

What is claimed:

1. The basic 11-ether of a 5,6-dihydro-6-morphanthridone having the formula

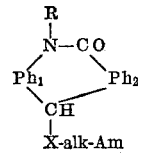

in which each of $Ph_1$ and $Ph_2$ is 1,2-phenylene, (lower alkyl)-1,2-phenylene, (lower alkoxy)-1,2-phenylene or (halogeno)-1,2-phenylene, X is oxygen or sulfur, R is hydrogen, lower alkyl or lower alkanoyl, alk is lower alkylene separating X from Am by at least 2 carbon atoms and Am is amino, mono- or di-lower alkylamino, 5 to 8 ring-membered lower alkyleneimino, morpholino or 4-methyl-piperazino, or alk-Am together is N-methyl-3- or 4-piperidyl, N-ethyl-3 or 4-piperidyl, N-methyl-3- or 4-piperidylmethyl or N-ethyl-3- or 4-piperidylmethyl, or the 6-lower alkyliminoethers of the compounds in which R is hydrogen, therapeutically useful acid addition salts or lower alkyl quaternaries thereof.

2. A compound as claimed in claim 1 and having the formula

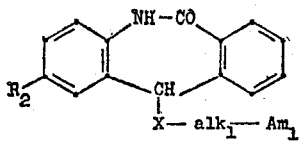

in which $alk_1$ is 1,2-ethylene, 1,2-propylene or 1,3-propylene, $Am_1$ is dimethylamino, diethylamino, pyrrolidino, piperidino, morpholino or 4-methyl-piperazino, or $alk_1$-$Am_1$ together is N-methyl-3- or 4-piperidyl, N-ethyl-3- or 4-piperidyl, N-methyl-3- or 4- piperidylmethyl or N-ethyl-3- or 4-piperidylmethyl, X is oxygen or sulfur and $R_2$ is hydrogen or chlorine or a therapeutically useful acid addition salt thereof.

3. A compound as claimed in claim 1, and being the 11 - (2 - dimethylamino-ethoxy)-5,6-dihydro-6-morphanthridone, its 2-chloro-derivative or a therapeutically useful acid addition salt thereof.

4. A compound as claimed in claim 1, and being the 2 - chloro-11-(3-dimethylamino-propoxy)-5,6-dihydro-6-morphanthridone or a therapeutically useful acid addition salt thereof.

5. A compound as claimed in claim 1, and being the 2-chloro-11-(2-pyrrolidino-ethoxy)-5,6-dihydro-6-morphanthridone or a therapeutically useful acid addition salt thereof.

6. A compound as claimed in claim 1, and being the 2-chloro-11-(2 - piperidino-ethoxy)-5,6-dihydro-6-morphanthridone or a therapeutically useful acid addition salt thereof.

7. A compound as claimed in claim 1, and being the 2-chloro-11-(1 - ethyl-3-piperidyloxy)-5,6-dihydro-6-morphanthridone or a therapeutically useful acid addition salt thereof.

8. A compound as claimed in claim 1, and being the 2-chloro - 11 - (2-morpholino-ethoxy)-5,6-dihydro-6-morphanthridone or a therapeutically useful acid addition salt thereof.

9. A compound as claimed in claim 1, and being the 2-chloro-11-(1-methyl-3- or 4 - piperidyloxy)-5,6-dihydro-6-morphanthridone or a therapeutically useful acid addition salt thereof.

10. A compound as claimed in claim 1, and being the 11-(1 - methyl-3-piperidylmethoxy)-5,6-dihydro-6-morphanthridone, its 2-chloro-derivative or a therapeutically useful acid addition salt thereof.

11. A compound as claimed in claim 1, and being the 11 - (2 - dimethylamino-ethylmercapto) - 5,6 - dihydro-6-morphanthridone, its 2-chloro-derivative or a therapeutically useful acid addition salt thereof.

References Cited

UNITED STATES PATENTS 3,173,913  3/1965  Van der Stelt _____ 260—239.3
3,431,257  3/1969  Aichinger et al. _____ 260—239.3

HENRY R. JILES, Primary Examiner

R. T. BOND, Assistant Examiner

U.S. Cl. X.R.

424—244, 248, 250, 267, 274